(12) United States Patent
Swartz et al.

(10) Patent No.: US 9,655,057 B2
(45) Date of Patent: May 16, 2017

(54) NOISE FLOOR DRIVEN ACCESS POINT TRANSMISSION POWER

(71) Applicant: Cisco Technology, Inc., San Jose, CA (US)

(72) Inventors: John Matthew Swartz, Lithia, FL (US); Joshua Suhr, Lenexa, KS (US); Matthew A. Silverman, Shaker Heights, OH (US); Paul J. Stager, Akron, OH (US)

(73) Assignee: Cisco Technology, Inc., San Jose, CA (US)

( * ) Notice: Subject to any disclaimer, the term of this patent is extended or adjusted under 35 U.S.C. 154(b) by 147 days.

(21) Appl. No.: 14/446,993

(22) Filed: Jul. 30, 2014

(65) Prior Publication Data

US 2016/0037459 A1  Feb. 4, 2016

(51) Int. Cl.
H04W 4/00    (2009.01)
H04W 52/24   (2009.01)
H04W 52/22   (2009.01)
H04W 52/50   (2009.01)
H04W 84/12   (2009.01)
H04W 52/14   (2009.01)
H04W 52/40   (2009.01)

(52) U.S. Cl.
CPC ....... H04W 52/241 (2013.01); H04W 52/223 (2013.01); H04W 52/242 (2013.01); H04W 52/50 (2013.01); H04W 52/143 (2013.01); H04W 52/245 (2013.01); H04W 52/40 (2013.01); H04W 84/12 (2013.01)

(58) Field of Classification Search
CPC .................................. H04W 52/241
USPC ......................................... 370/329
See application file for complete search history.

(56) References Cited

U.S. PATENT DOCUMENTS

| | | | |
|---|---|---|---|
| 7,340,375 B1 | 3/2008 | Patenaud et al. | |
| 7,515,884 B2 | 4/2009 | Blech et al. | |
| 8,700,077 B2 | 4/2014 | Schmidt | |
| 2003/0181211 A1* | 9/2003 | Razavilar | H04W 16/10 455/450 |
| 2004/0082356 A1* | 4/2004 | Walton | H04B 7/022 455/522 |
| 2005/0245237 A1 | 11/2005 | Adachi et al. | |
| 2008/0004076 A1 | 1/2008 | Adachi et al. | |

(Continued)

OTHER PUBLICATIONS

Geier, "Tips for Extending Access Point Coverage," Sep. 23, 2004, retrieved from http://www.wi-fiplanet.com/print/tutorials/article.php/3412051/Tips-for-Extending-Access-Point-Coverage.htm, on Jul. 29, 2014, 2 pages.

(Continued)

Primary Examiner — Shripal Khajuria
(74) Attorney, Agent, or Firm — Edell, Shapiro & Finnan, LLC

(57) ABSTRACT

Apparatus and techniques are presented for estimating a noise floor experienced by a client device seeking to associate with an access point in a wireless network. A path loss between the client device and the access point may be estimated. A metric may then be generated, where the metric estimates a strength of a signal transmitted from the access point as received at the client device. The transmit power at the access point may then be adjusted, based on the metric.

24 Claims, 8 Drawing Sheets

(56) References Cited

U.S. PATENT DOCUMENTS

2011/0307609 A1 12/2011 Rangarajan et al.
2015/0156647 A1* 6/2015 Braun .................. H04W 24/08
                                                          455/426.1

OTHER PUBLICATIONS

Meru Networks, AP332 Dual-radio, Three-stream 802.11n Wireless Access Point, Data Sheet, retrieved from www.merunetworks.com/collateral/data-sheets/ds-wireless-access-points-for-high-density-environments-ap332.pdf, on Jul. 29, 2014, 3 pages.
Higgins, "Why High Power Routers Don't Improve Range," SmallNetBuilder, Jun. 24, 2011, updated Jun. 26, 2011, retrieved from http://www.smallnetbuilder.com/wireless/wireless-basics/31516-why-high-power-routers-dont-improve-range, on Jul. 29, 2014, 4 pages.
SpectrumConsult, "The challenge of High Density Heterogeneous Wi-Fi Networks," retrieved from http://www.spectrumconsult.net/HDHnetworking-summary-r1a.pdf, on Jul. 29, 2014, 12 pages.
Aerohive Networks, Inc., "High-Density Wi-Fi Design Principles," White Paper, retrieved from http://www.aerohive.com/pdfs/Aerohive-Whitepaper-Hi-Density%20Principles.pdf, on Jul. 29, 2014, 23 pages.
Aruba Networks, "High-Density Wireless Networks for Auditoriums Validated Reference Design," Solution Guide, Oct. 2010, retrieved from http://www.arubanetworks.com/wp-content/uploads/DG_HighDensity_VRD.pdf, on Jul. 29, 2014, 122 pages.

* cited by examiner

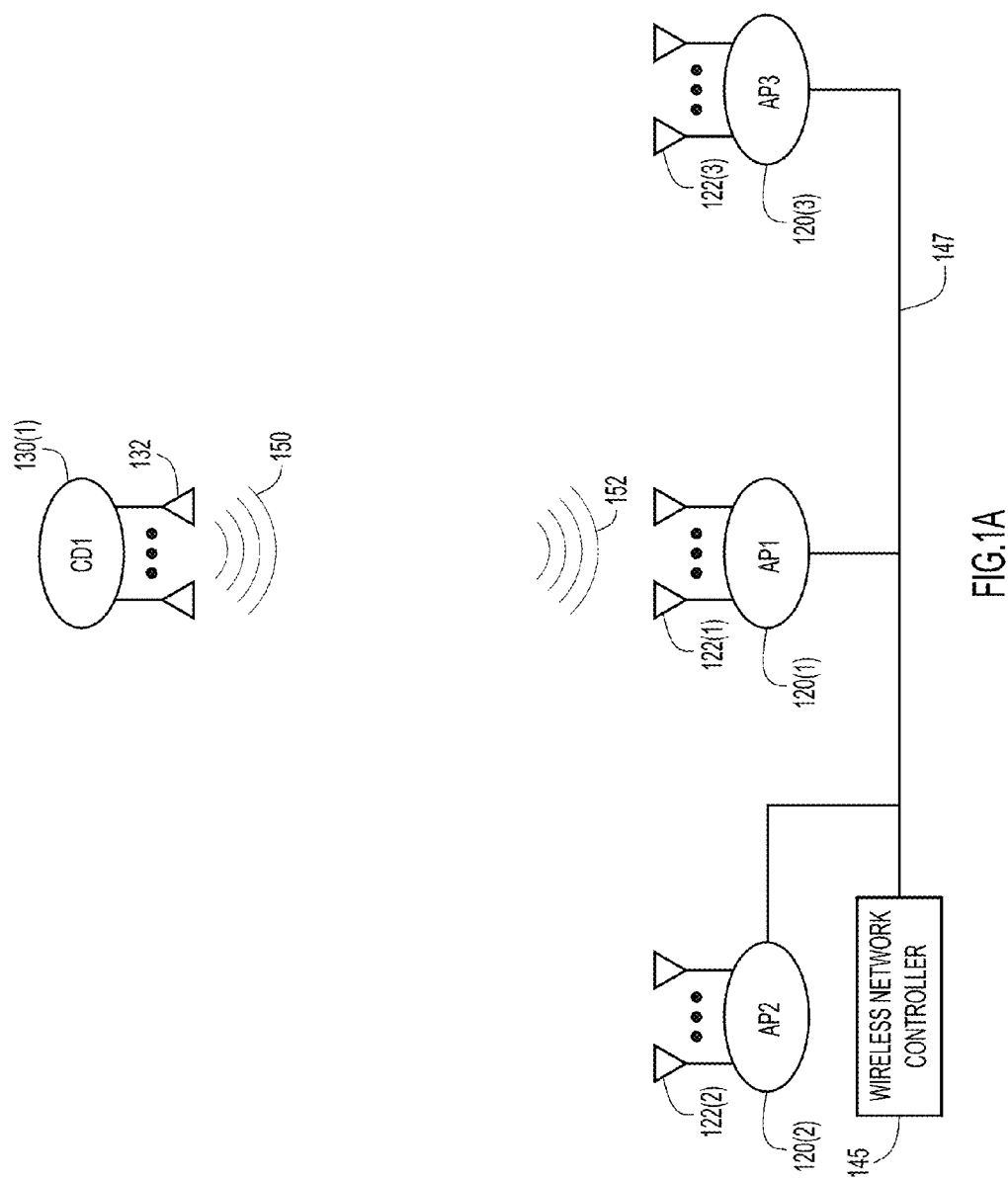

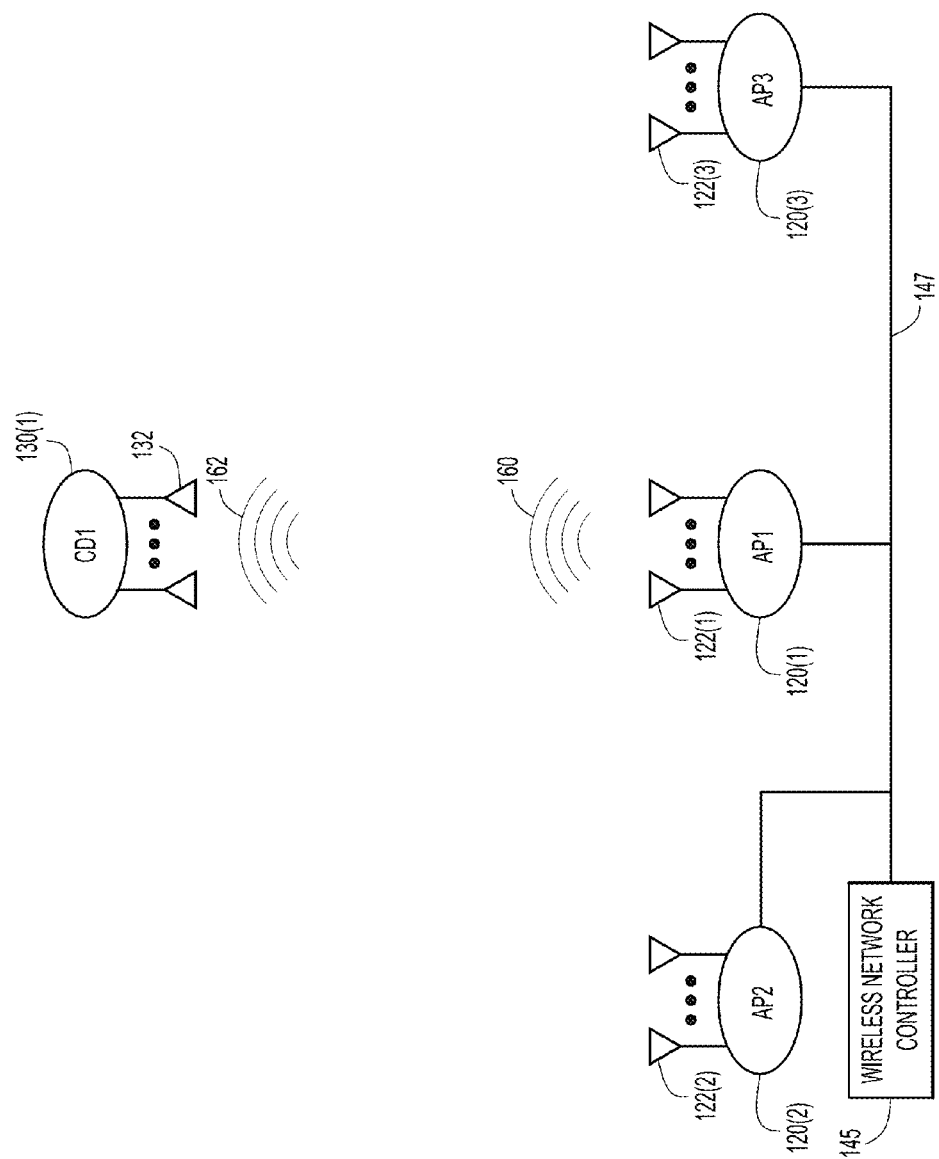

NOISE FLOOR DRIVEN ACCESS POINT TRANSMISSION POWER

TECHNICAL FIELD

The present disclosure relates to wireless communications.

BACKGROUND

In high density environments, such as stadiums or large public venues, a large number of Wi-Fi™ enabled client devices will be trying to associate with an access point through which broader connectivity may be attained with, for example, the Internet. These association attempts take the form of probe requests transmitted by the client devices. These requests can drive up the noise floor as seen by access points and by client devices. The extent to which a client device probes can vary by device type and model.

BRIEF DESCRIPTION OF THE DRAWINGS

FIGS. 1A and 1B illustrate a system in which the apparatus and processing described herein may operate, according to an example embodiment.

DESCRIPTION OF EXAMPLE EMBODIMENTS

Overview

Figure 2:
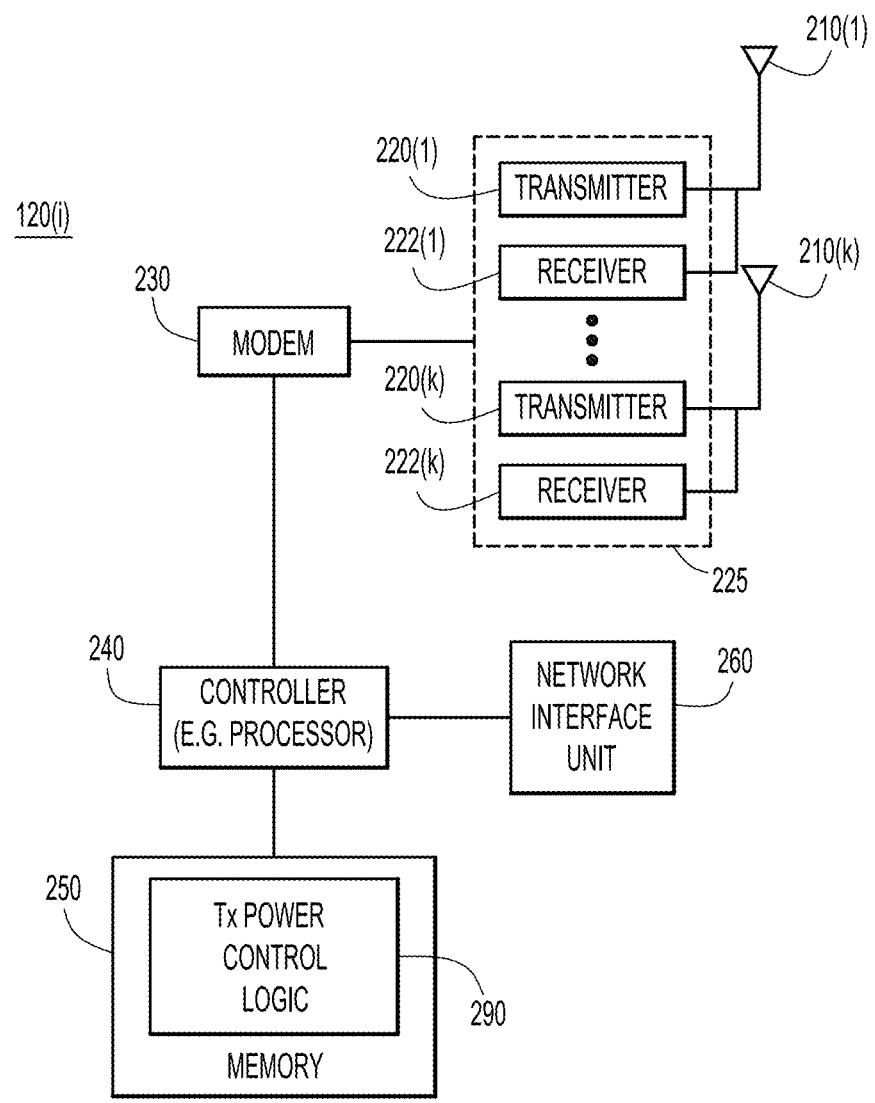
FIG. 2 is a block diagram of an access point, according to an example embodiment.

Apparatus and techniques are presented herein for estimating a noise floor experienced by a client device that is seeking to associate with an access point (AP) in a wireless network. A path loss between the client device and the access point is estimated. A metric may then be generated, where the metric estimates a strength of a signal transmitted from the access point as received at the client device. The transmit power at the access point may then be adjusted, based on the metric.

Example Embodiments

In high density environments such as large public venues, a large number of Wi-Fi™ enabled client devices may be trying to associate with an AP through which broader connectivity may be attained with, for example, the Internet. Thousands of client devices may be seeking to associate with one of a relatively small number of APs. In some environments, only a single AP may be available.

Reference is now made to FIGS. 1A and 1B, with initial reference to FIG. 1A. The example shown in FIGS. 1A and 1B is simplified to illustrate the basic concepts of the environments within which the apparatus and methods presented herein may operate.

FIG. 1A shows an example in which there are three APs 120(1)-120(3) and one wireless client device 130(1). Each of the APs 120(1)-120(3) may have a plurality of antennas, shown collectively at each AP as reference numeral 122. The wireless client device 130(1) has one or more antennas shown as reference numeral 132. Client device 130(1) initially sends a message 150, e.g., a probe request message in accordance with the IEEE 802.11 protocol, for example. Reference numeral 152 shows that AP 120(1) receives the message 150. AP 120(1) can then send a probe response message to client device 130(1). The illustrated system also includes a wireless network controller 145. The wireless network controller 145 is configured to provide administrative and management services and to execute policies relating to access and performance. In embodiments of the system described herein, the wireless network controller 145 executes logic for the control and adjustment of transmission power at one or more of the APs 120.

In FIG. 1B, after AP 120(1) receives the message 150, AP 120(1) transmits a probe response message 160, to client device 130(1). This represents a simplified scenario; in an actual wireless network deployment there may be numerous client devices. To that end, consider that there are numerous probe request/probe responses exchanges occurring between a given one of a plurality of APs and numerous client devices. This is particularly problematic in high-density wireless network deployments.

Recent tests reveal that an unassociated client device sends out bursts of probe requests for every service set identifier (SSID) known to the device. This can take place several times each second. Once that client device is associated with an access point, the probing from the client device becomes less frequent. As more clients become associated with the access point(s), the noise floor may become lower.

Until that happens, however, the noise floor will rise as the number of client devices in the environment increases. As the noise floor increases for the access points and client devices in a high density environment, the signal-to-noise ratio (SNR) decreases, making reception at high data rates more challenging for the client devices. Consequently, capacity suffers. In high density environments, as more client devices enter the environment, there may be an inflection point where the noise floor, previously driven by weak co-channel interference from distant access points, becomes largely driven by probing from distant client devices. As the noise floor rises, it may reach a point where the signal-to-interference-plus-noise ratio (SINR) level degrades below the level required to support both the high data rates for client devices close to an access point and the lowest basic rates to the client devices at the edge of a cell. As client devices at the edge of the cell become disconnected due to low SINR, they may become probing client devices, worsening the noise floor even further. This degradation if the SINR can thereby enter a vicious cycle.

Referring now to FIG. 2, a block diagram is shown of an AP 120(i) configured to perform the techniques described herein. The diagram in FIG. 2 is meant to be representative of any of the APs referred to herein. The AP 120(i) comprises a plurality of antennas, 210(1)-210(k), and a corresponding plurality of transmitters 220(1)-220(k) and receivers 222(1)-222(k), each coupled to a corresponding one of the plurality of antennas 210(1)-210(k). The plurality of transmitters 220(1)-220(k) and receivers 222(1)-222(k) may be part of an integrated radio transceiver 225. A baseband processing unit or modem 230 is coupled to the radio transceiver 225, and performs baseband signal processing, such as baseband modulation of transmit signals and baseband demodulation of receive signals.

A control unit (controller) 240 is coupled to the baseband processing unit 230. The control unit 240 performs high level control of the AP. The control unit 240 may comprise a microprocessor or microcontroller that executes software instructions stored in memory 250. The AP includes a network interface unit 260, e.g., a network interface card, to enable wired network communications on behalf of the AP.

The memory 250 stores instructions for the processing described herein. In particular, memory 250 stores transmit (Tx) power control software 290 that, when executed by the controller 240, causes the controller unit 240 to perform the operations described herein to allow an AP to adjust its Tx power. As will be described in greater detail below, the Tx power can be adjusted according to the logic of Tx power control software 290 in consideration of factors such as SNR, the noise floor and path loss.

The baseband processing unit 230 may be implemented by digital logic in one or more circuits, or may be implemented by additional software executed by the control unit 240.

The memory 250 may comprise read only memory (ROM), random access memory (RAM), magnetic disk storage media devices, optical storage media devices, flash memory devices, electrical, optical, or other physical/tangible memory storage devices. Thus, in general, the memory 250 may comprise one or more tangible (non-transitory) computer readable storage media (e.g., a memory device) encoded with software comprising computer executable instructions. When the software is executed (by the control unit 240), it is operable to perform the operations described herein. As part of the operations performed when executing the software 290, the control unit 240 may determine how the transmit power of the AP 120(*i*) is to be adjusted.

Figure 3:
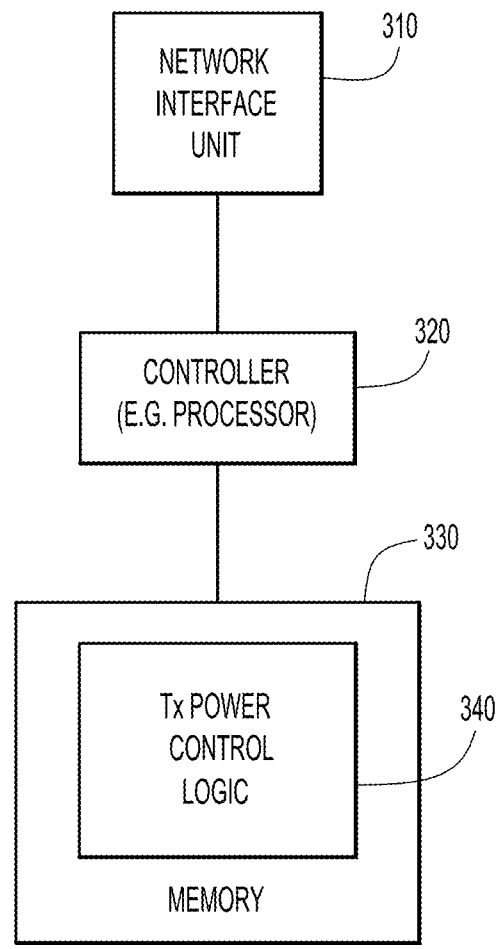
FIG. 3 is a block diagram of a wireless network controller, according to an embodiment.

Turning now to FIG. 3, an example block diagram is shown for the wireless network controller 145, as depicted in FIGS. 1A and 1B. The wireless network controller 145 may take the form of a server computer or server blade, or may be embodied by one or more virtual machines running in a data center computing environment. The wireless network controller 145 includes a network interface unit 310 to enable wired (or wireless) network communications with APs in a wireless network, a processor (or multiple processors) 320 and memory 330.

In an alternative embodiment, the memory 330 stores Tx power control software 340 that, when executed by the controller 320, causes the wireless network controller 145 to perform the operations described herein to allow an AP to adjust its transmit power. As will be described in greater detail below, the transmit power can be adjusted according to the logic of Tx power control software 340 in consideration of factors such as SNR, the noise floor and path loss. In the embodiment of FIG. 3, the logic that is otherwise implemented by software 290 (and executed by controller 240 of an AP in FIG. 2) is implemented instead as software 340 and executed by controller 320 in wireless network controller 145.

Figure 4:
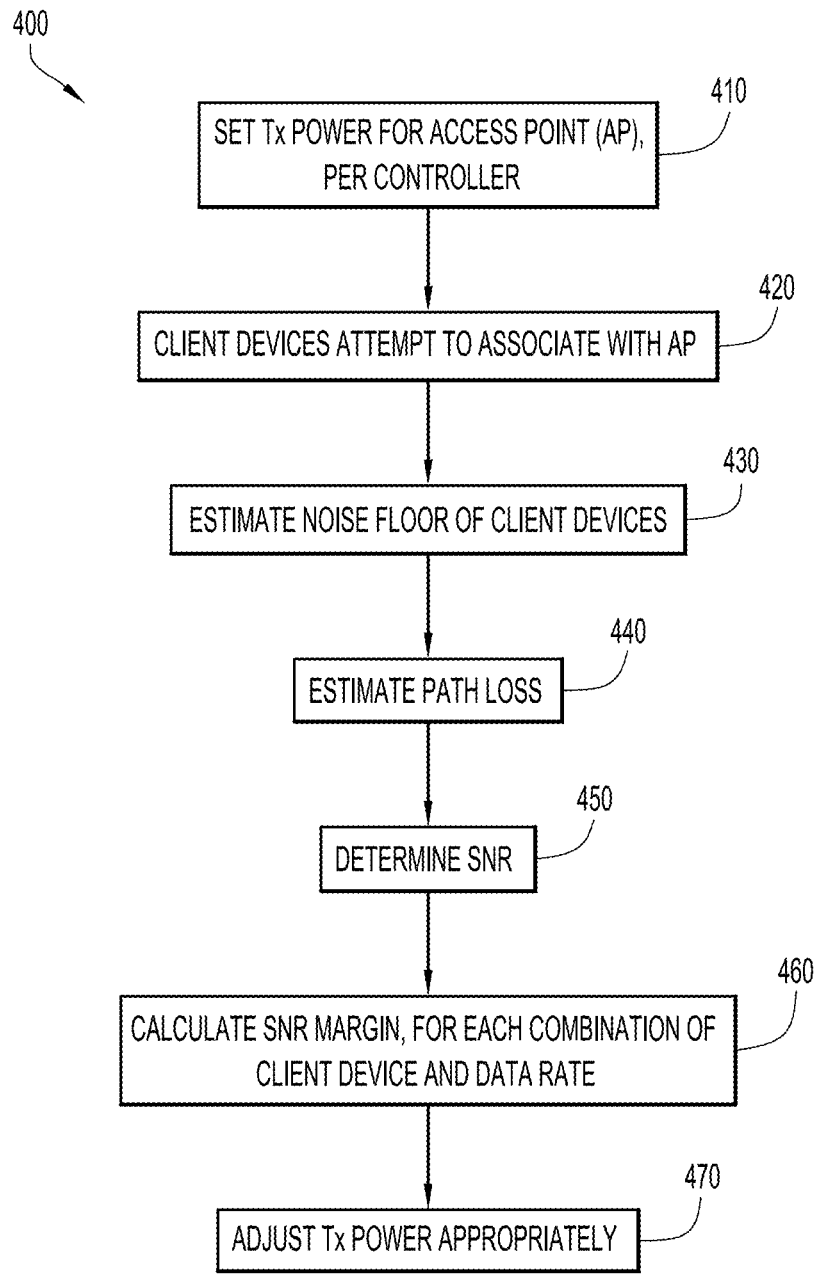
FIG. 4 is a flowchart illustrating the processing flow according to an example embodiment.

Reference is now made to FIG. 4 for a description of the Tx power control process, according to an example embodiment. At 410, the Tx power at an access point is set to an initial level. The initial setting may be defined by controller 240 executing software in memory 250, for example. This initial setting may be factory or network administrator configured to be used when an AP boots up for the first time or re-boots. At 420, client devices attempt to associate with the access point. At 430, the noise floor experienced by client devices is estimated. In an embodiment, the noise floor is estimated by measuring the noise floor "seen" or observed by the receiver(s) at the access point. In most access points, a noise floor value is made available by the receiver (part of a chipset) in the access point. Using a noise floor measurement at the access point as a proxy for the noise floor at a client device is sufficiently accurate and representative of the noise floor at a client device in view of the fact that, as the number of client devices in a cell increases, the sources of noise tend to be evenly distributed spatially.

At 440, the path loss between the AP and the client device is estimated. Methods for such an estimate are known to persons of ordinary skill in the art. Some methods for path loss estimation are documented in IEEE 802.11, for example. In an embodiment, estimation of path loss may be performed by reading received signal strength indication information in packets received from one or more clients within range of the AP. In an embodiment, this information takes the form of signal strength indicators (RSSIs). In an embodiment, the path loss estimate may be an average or other statistical function of RSSIs from a sample of client devices.

At 450, a required SNR is determined for one or more client devices seeking to associate with the AP. For a given client device, the required SNR may vary with different data rates at which the client device can operate. In an embodiment, the required SNR is determined for each of a plurality of client devices and each of their respective data rates. Such information may be determined from publicly available information, e.g., published by client device vendors. Alternatively, this information can be provided by the client devices themselves, either with or without a query from the AP.

At 460, an SNR margin is calculated. In an embodiment, the SNR margin is calculated as:

$$\text{SNR margin} = (Tx\ \text{power}) - (\text{path loss}) - (\text{noise floor}).$$

In an embodiment, the SNR margin is calculated for each combination of client device and data rate.

At 470, the Tx power at the AP is adjusted as necessary. In an embodiment, the adjustment of the Tx power is made so that the SNR margin exceeds the SNR requirement for one or more client devices at one or more of their data rates. For purposes of the present discussion, an SNR margin that meets or exceeds the SNR requirement for a particular client device at a particular data rate is said to be a positive SNR margin for this client device and data rate.

Figure 5:
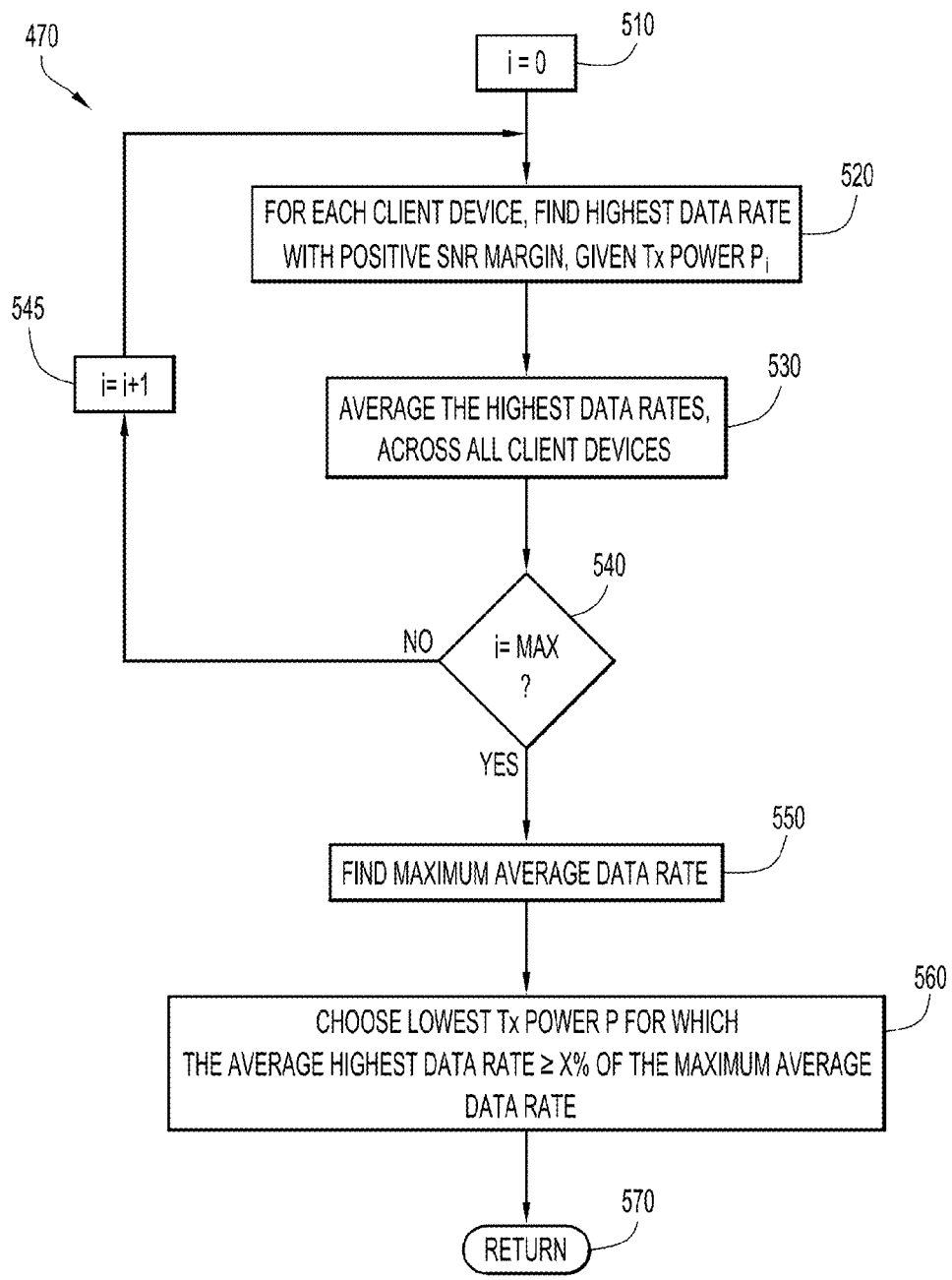
FIG. 5 is a flowchart illustrating the adjustment of transmit power at an access point, according to an example embodiment.

The adjustment of Tx power (470 of FIG. 4) is illustrated in FIGS. 5-8 according to various embodiments. In the embodiment of FIG. 5, information is first collected regarding SNR margins at various Tx power settings of the AP, over a plurality of client devices and data rates. In an embodiment, this plurality of client devices may be the set of client devices that have associated with the AP. Alternatively, this plurality of client devices may include all client devices known to be in range of the AP. In the process as illustrated, the Tx power can take any of several discrete values, identified here as $P_0, P_1, \ldots P_{max}$. At 510, an index i is initialized to 0. At 520, for each client device, given a Tx power of $P_i$, the highest data rate is determined at which a positive SNR margin is obtained. At 530, these highest data rates are averaged over all client devices. At 540, a determination is made as to whether i=max, i.e., whether $P_i$ has reached $P_{max}$. If not, then the index i is incremented at 545, and the sequence 520-540 is repeated for the next Tx power level $P_i$. Effectively, for each Tx power level, the average highest data rate is determined across the plurality of client devices.

At 550, the maximum of the average highest data rates is found. At 560, the lowest Tx power setting in the range ($P_0$ ... $P_{max}$) is chosen, such that the average highest data rate for this Tx power is greater than or equal to a predetermined percentage (X) of the maximum average data rate identified at 550. This chosen Tx power level is then used at the AP. In an embodiment, X has a value of 90%. The process concludes at 570.

Figure 6:
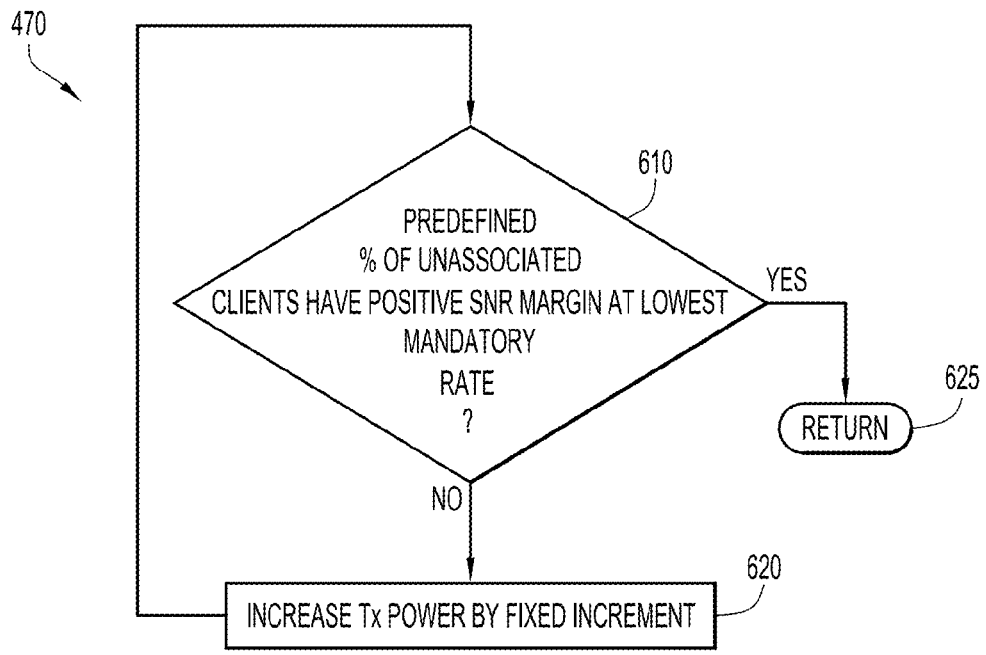
FIG. 6 is a flowchart illustrating the adjustment of transmit power at an access point, according to an alternative embodiment.

An alternative embodiment is illustrated in FIG. 6. In FIG. 6, the adjustment of Tx power at the AP is iterative and incremental, and is sufficient when a predefined percentage of unassociated client devices have a positive SNR margin at their respective lowest mandatory data rates. At 610, a determination is made as to whether, at a current Tx power level, a predefined proportion of unassociated client devices have a positive SNR margin at their respective lowest mandatory data rates. If not, then at 620 the Tx power at the AP is increased by a fixed amount, and the determination at 610 is repeated. Otherwise, the process concludes at 625. In an embodiment, the predefined proportion is 90%.

Figure 7:
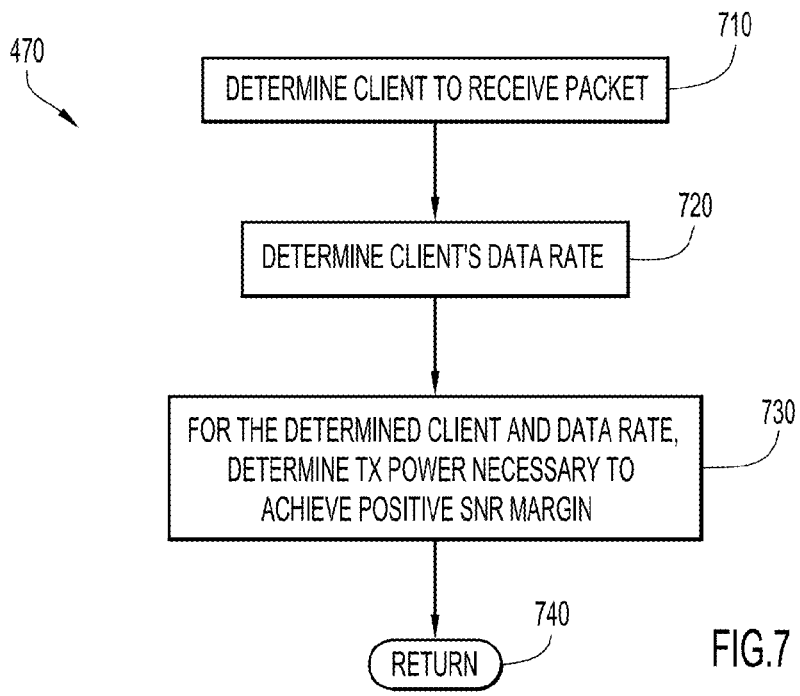
FIG. 7 is a flowchart illustrating the adjustment of transmit power at an access point, according to a further alternative embodiment.

Another alternative embodiment is shown in FIG. 7. In this embodiment, the determination of the Tx power for the AP is made in a manner that is specific to a particular client device. At 710, it is determined which client device is to receive a packet. At 720, the data rate being used for the client device is determined. At 730, a Tx power for the AP is chosen, such that the chosen Tx power results in a positive SNR margin for the particular client device and data rate. The process concludes at 740.

Figure 8:
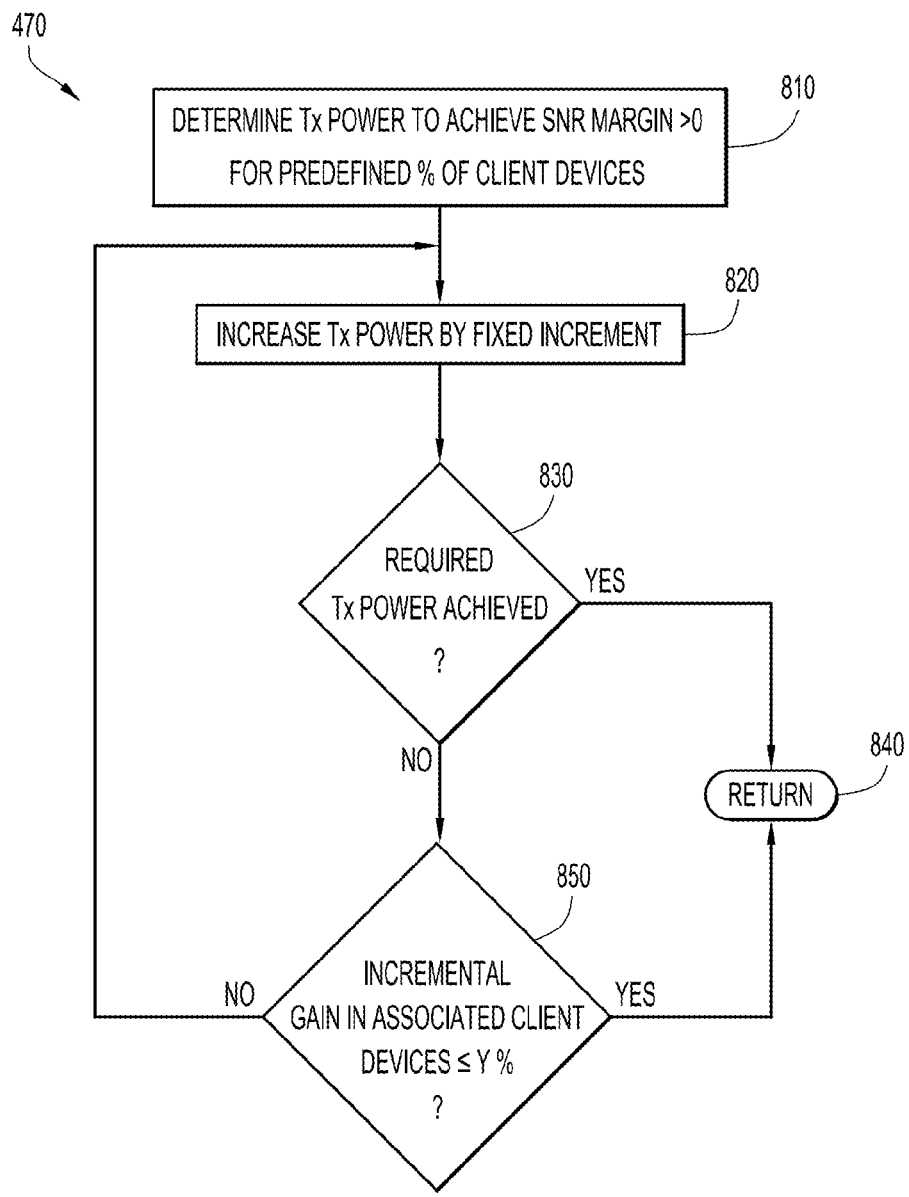
FIG. 8 is a flowchart illustrating the adjustment of transmit power at an access point, according to a still further alternative embodiment.

Still another embodiment is illustrated in FIG. 8. Here, Tx power at the AP is incremented iteratively until either a target level is reached, or the number of additional client devices that have newly associated with the AP after each power increment becomes relatively small. At 810, a Tx power at the AP is determined, where the power level results in a SNR margin that is positive for a predefined percentage of client devices operating at respective predefined data rates. In an embodiment, this percentage is 90% of the client devices.

At 820, the current Tx power is increased by a fixed increment. At 830, a determination is made as to whether the Tx power level determined at 810 has been reached or exceeded. If so, the process concludes at 840 and there are no further Tx power increases. Otherwise, the process continues at 850. Here, a determination is made as to whether the relative increase in newly associated client devices after the Tx power increment of 820 is significant. Specifically, it is determined whether the growth in newly associated client devices is less than or equal to a predetermined threshold. In an embodiment, this percentage is 5%. If the determination of 850 is positive, then the process concludes at 840 and there are no further Tx power increases. The condition of 850 represents a situation where the growth in newly associating client devices has slowed to a level where increases in Tx power at the AP are yielding minimal benefit.

The processing described above with respect to FIGS. 4-8 may be implemented in hardware, firmware, software, or in a combination thereof. Referring to FIGS. 2 and 3, in a software embodiment, executable instructions for such processing are stored in a memory component, e.g., in memory device(s) 250 in the embodiment of FIG. 2 or in memory device(s) 330 of the embodiment of FIG. 3. Such memory devices may comprise read only memory (ROM), random access memory (RAM), magnetic disk storage media devices, optical storage media devices, flash memory devices, electrical, optical, or other physical/tangible memory storage devices. The controllers 240 and 320 can each be, for example, a microprocessor or microcontroller that executes instructions for the Tx power control software. Thus, in general, the memory devices 250 and 330 may each comprise one or more tangible (non-transitory) computer readable storage media (e.g., a memory device) encoded with software comprising computer executable instructions. When the software is executed (by the controller 240 or 320), the controller and software are collectively operable to perform the operations described herein and illustrated in FIGS. 4-8.

The above description is intended by way of example only. Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

Thus, in one form, a method is provided comprising: estimating a noise floor experienced by a client device seeking to associate with an access point in a wireless network; estimating a path loss between the client device and the access point; generating a metric estimating a strength of a signal transmitted from the access point as received at the client device; and adjusting a transmit power at the access point based on the metric.

In another form, one or more computer readable non-transitory storage media are provided encoded with software comprising computer executable instructions that when executed by a processor, cause the processor to: estimate a noise floor experienced by a client device seeking to associate with an access point in a wireless network; estimate a path loss between the client device and the access point; generate a metric estimating a strength of a signal transmitted from the access point as received at the client device; and adjust a transmit power at the access point based on the metric.

In still another form, an apparatus is provided comprising: at least one transmitter; at least one receiver; and a controller coupled to the transmitter and the receiver, to: estimate a noise floor experienced by a client device seeking to associate with an access point in a wireless network; estimate a path loss between the client device and the access point; generate a metric estimating a strength of a signal transmitted from the access point as received at the client device; and adjust a transmit power at the access point based on the metric.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the example embodiments disclosed herein.

What is claimed is:
1. A method comprising:
   at an access point, determining a transmit power to transmit a signal to a client device seeking to associate with the access point, the determining including:

setting a transmit power at which the access point transmits the signal to an initial level;

receiving one or more probe requests from the client device;

measuring a noise floor experienced at the access point and estimating a noise floor experienced by the client device as being equal to the noise floor experienced at the access point;

determining received signal strength indication (RSSI) information from the received one or more probe requests;

estimating a path loss between the access point and the client device based on the determined RSSI information;

determining a required signal-to-noise ratio (SNR) for the client device;

computing a SNR margin experienced at the client device based on the transmit power, the estimated path loss, and the estimated noise floor experienced by the client device; and adjusting the transmit power so that the computed SNR margin experienced at the client device is greater than the required SNR for the client device.

2. The method of claim 1, wherein the determining the transmit power to transmit the signal to the client device includes determining the SNR margin at multiple transmit powers of the transmit signal across multiple client devices seeking to associate with the access point and at multiple data rates for each client device, and wherein the adjusting the transmit power comprises:

for each transmit power, determining a respective average highest data rate among the multiple data rates at which a positive SNR is obtained across the multiple client devices;

finding a maximum average highest data rate among the average highest data rates; and selecting a lowest transmit power among the transmit powers for which the corresponding average highest data rate is greater than or equal to a percentage less than 100% of the maximum average highest data rate.

3. The method of claim 2, wherein the determining the respective average highest data rate includes:

finding a respective highest data rate at which a positive SNR is obtained at each client device for a given transmit power; and averaging the highest data rates across the multiple client devices to produce an average highest data rate corresponding to the given transmit power.

4. The method of claim 3, wherein the finding comprises:

repeating the receiving, the evaluating, the estimating, and the computing for the different data rates of each client device.

5. The method of claim 1, wherein the receiving, the determining RSSI information, the estimating, the determining the required SNR, and the computing are performed for multiple client devices each capable of operating at different data rates, and the adjusting the transmit power comprises:

iteratively increasing the transmit power at the access point until a predefined percentage that is less than 100% of the multiple client devices each has a SNR margin that is positive at a lowest mandatory data rate for the client device.

6. The method of claim 1, wherein the receiving, the determining RSSI information, the estimating, the determining the required SNR, and the computing are performed for a plurality of client devices seeking to associate with the access point and wherein adjusting the transmit power comprises:

iteratively increasing the transmit power at the access point until the SNR margin is positive for a predetermined proportion of the plurality of client devices.

7. The method of claim 1, wherein the receiving, the determining RSSI information, the estimating, the determining the required SNR, and the computing are performed for a plurality of client devices seeking to associate with the access point and wherein adjusting the transmit power comprises:

incrementally increasing the transmit power at the access point until an incremental gain in a number of client devices able to associate with the access point falls below a predetermined threshold number of client devices.

8. The method of claim 1, wherein adjusting the transmit power comprises:

adjusting the transmit power at the access point to a level that enables effective transmission at or above a transmit data rate used by the access point calculated on a basis of client data rate capabilities at a plurality of access point transmit power levels.

9. One or more computer readable non-transitory storage media encoded with software comprising computer executable instructions that when executed by a processor of an access point, cause the processor to:

determine a transmit power to transmit a signal to a client device seeking to associate with the access point, wherein the instructions to cause the processor to determine include instructions to cause the processor to:

set a transmit power at which the access point transmits the signal to an initial level;

receive one or more probe requests from the client device;

measure a noise floor experienced at the access point and estimate a noise floor experienced by the client device as being equal to the noise floor experienced at the access point;

determine received signal strength indication (RSSI) information from the received one or more probe requests;

estimate a path loss between the access point and the client device based on the determined RSSI information;

determine a required signal to-noise ratio (SNR) for the client device;

compute a SNR margin experienced at the client device based on the transmit power, the estimated path loss, and the estimated noise floor experienced by the client device; and adjust the transmit power so that the computed SNR margin experienced at the client device is greater than the required SNR for the client device.

10. The computer readable storage media of claim 9, further comprising instructions that cause the processor to:

determine the SNR margin at multiple transmit powers of the signal across multiple client devices seeking to associate with the access point and at multiple data rates for each client device, and wherein the instructions to cause the processor to adjust include instructions to cause the processor to:

for each transmit power, determine a respective average highest data rate among the multiple data rates at which a positive SNR is obtained across the multiple client devices;

find a maximum average highest data rate among the average highest data rates; and select a lowest transmit power among the transmit powers for which the corresponding average highest data rate is greater than or equal to a percentage less than 100% of the maximum average highest data rate.

11. The computer readable storage media of claim 10, wherein the instructions that cause the processor to determine the respective average highest data rate comprise instructions for:

finding a respective highest data rate at which a positive SNR is obtained at each client device for a given transmit power; and averaging the highest data rates across the multiple client devices to produce an average highest data rate corresponding to the given transmit power.

12. The computer readable storage media of claim 11, wherein the instructions that cause the processor to perform the finding comprise instructions to cause the processor to:

repeat the receive, the determine RSSI information, the estimate, the determine the required SNR, and the compute operations for the different data rates of each client device.

13. The computer readable storage media of claim 9, wherein the instructions that cause the processor to receive, determine RSSI information, estimate, determine the required SNR, and compute are executed for a plurality of client devices each capable of operating at different data rates, and the instructions that cause the processor to adjust the transmit power comprise instructions for:

iteratively increasing the transmit power at the access point until a predefined percentage that is less than 100% of the multiple client devices each has a SNR margin that is positive at a lowest mandatory data rate for the client device.

14. The computer readable storage media of claim 9, wherein the instructions that cause the processor to receive, determine RSSI information, estimate, determine the required SNR, and compute are executed for a plurality of client devices seeking to associate with the access point, and wherein the instructions that cause the processor to adjust the transmit power comprise instructions for:

iteratively increasing the transmit power at the access point until the SNR margin is positive for a predetermined proportion of the plurality of client devices.

15. The computer readable storage media of claim 9, wherein the instructions that cause the processor to receive, determine RSSI information, estimate, determine the required SNR, and compute are executed for a plurality of client devices seeking to associate with the access point, and wherein the instructions that cause the processor to adjust the transmit power comprise instructions for:

incrementally increasing the transmit power at the access point until an incremental gain in a number of client devices able to associate with the access point falls below a predetermined threshold number of client devices.

16. The computer readable storage media of claim 9, wherein the instructions that cause the processor to adjust the transmit power comprise instructions for:

adjusting the transmit power at the access point to a level that enables effective transmission at or above a transmit data rate used by the access point calculated on a basis of client data rate capabilities at a plurality of access point transmit power levels.

17. An apparatus comprising:
at least one transmitter;
at least one receiver; and
a controller coupled to the at least one transmitter and the at least one receiver, to:
determine a transmit power to transmit a signal to a client device seeking to associate with the access point, wherein the controller is configured to:
set a transmit power at which the access point transmits the signal to an initial level;
receive one or more probe requests from the client device;
measure a noise floor experienced at the access point and estimating a noise floor experienced by the client device as being equal to the noise floor experienced at the access point;
determine received signal strength indication (RSSI) information from the received one or more probe requests;
estimate a path loss between the access point and the client device based on the determined RSSI information;
determine a required signal-to-noise ratio (SNR) for the client device;
compute a SNR margin experienced at the client device based on the transmit power, the estimated path loss, and the estimated noise floor experience by the client device; and
adjust the transmit power so that the computed SNR margin experienced at the client device is greater than the required SNR for the client device.

18. The apparatus of claim 17, wherein the controller is further configured to determine the SNR margin at multiple transmit powers of the transmit signal across multiple client devices including the client device seeking to associate with the access point and at multiple data rates for each client device, and wherein the controller is configured to adjust the transmit power by:

for each transmit power, determining a respective average highest data rate among the multiple data rates at which a positive SNR is obtained across the multiple client devices;

finding a maximum average highest data rate among the average highest data rates; and selecting a lowest transmit power among the transmit powers for which the corresponding average highest data rate is greater than or equal to a percentage less than 100% of the maximum average highest data rate.

19. The apparatus of claim 18, wherein the controller is configured to determine the respective average highest data rate by:

finding a respective highest data rate at which a positive SNR is obtained at each client device for a given transmit power; and averaging the highest data rates across the multiple client devices to produce an average highest data rate corresponding to the given transmit power.

20. The apparatus of claim 19, wherein the controller is configured to perform the finding by:

repeating the receive, the determine RSSI information, the estimate, the determine the required SNR, and the compute operations for the different data rates of each client device.

21. The apparatus of claim 17, wherein the controller is configured to perform the receive, the determine RSSI information, the estimate, the determine the required SNR, and the compute operations for a plurality of client devices each capable of operating at different data rates, and the controller is configured to adjust the transmit power by:

iteratively increasing the transmit power at the access point until a predefined percentage that is less than 100% of the multiple client devices each has a SNR margin that is positive at a lowest mandatory data rate for the client device.

22. The apparatus of claim 17, wherein the controller is configured to perform the receive, the determine RSSI information, the estimate, the determine the required SNR, and the compute operations for a plurality of client devices seeking to associate with the access point, and the controller is configured to adjust the transmit power by:

iteratively increasing the transmit power at the access point until the SNR margin is positive for a predetermined proportion of the plurality of client devices.

23. The apparatus of claim 17, wherein the controller is configured to perform the receive, the determine RSSI information, the estimate, the determine the required SNR, and the compute operations for a plurality of client devices seeking to associate with the access point, and the controller is configured to adjust the transmit power by:

incrementally increasing the transmit power at the access point until an incremental gain in a number of client devices able to associate with the access point falls below a predetermined threshold number of client devices.

24. The apparatus of claim 17, wherein the controller is configured to adjust the transmit power by:

adjusting the transmit power at the access point to a level that enables effective transmission at or above a transmit data rate used by the access point calculated on a basis of client data rate capabilities at a plurality of access point transmit power levels.

\* \* \* \* \*